United States Patent
Chou et al.

(10) Patent No.: US 8,791,595 B2
(45) Date of Patent: Jul. 29, 2014

(54) SERVER MANAGEMENT SYSTEM AND METHOD

(75) Inventors: Shu-Hsien Chou, New Taipei (TW); Kang-Bin Wang, Shenzhen (CN); Li-Wen Guo, Shenzhen (CN); Bi-Hui Tan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 608 days.

(21) Appl. No.: 13/005,744

(22) Filed: Jan. 13, 2011

(65) Prior Publication Data

US 2012/0032510 A1 Feb. 9, 2012

(30) Foreign Application Priority Data

Aug. 3, 2010 (CN) .......................... 2010 1 0243694

(51) Int. Cl.
*H02J 3/14* (2006.01)
*H02J 3/00* (2006.01)
*H02J 9/00* (2006.01)
*G05D 23/00* (2006.01)
*G06F 11/30* (2006.01)

(52) U.S. Cl.
USPC ............... 307/39; 307/11; 307/38; 307/64; 700/300; 702/186

(58) Field of Classification Search
None
See application file for complete search history.

(56) References Cited

U.S. PATENT DOCUMENTS

| | | | |
|---|---|---|---|
| 6,351,601 B1 * | 2/2002 | Judkins, III | 388/815 |
| 2006/0259797 A1 * | 11/2006 | Fung | 713/300 |
| 2008/0306635 A1 * | 12/2008 | Rozzi | 700/300 |
| 2009/0147459 A1 * | 6/2009 | Nguyen et al. | 361/679.31 |
| 2011/0138226 A1 * | 6/2011 | Kong | 714/27 |

* cited by examiner

*Primary Examiner* — Jared Fureman
*Assistant Examiner* — Aqeel Bukhari
(74) *Attorney, Agent, or Firm* — Novak Druce Connolly Bove + Quigg LLP

(57) ABSTRACT

In a server management method, a blade server system including a plurality of blade servers is connected to a monitor device in series. The monitor device sends a command to the server system to control the plurality of blade servers. The plurality of blade servers responds to the command. The monitor device receives information from the server system to monitor and control the plurality of blade servers. A server monitor system associated with the server monitor method is also disclosed.

7 Claims, 4 Drawing Sheets

SERVER MANAGEMENT SYSTEM AND METHOD

BACKGROUND

1. Technical Field

The present disclosure relates to server management systems and methods, more particularly a server management system and method for monitoring and controlling a plurality of blade servers which is connected in series.

2. Description of Related Art

A blade server system usually includes a plurality of blade servers mounted in a server rack. Each of the blade servers can work independently. The blade servers of the server system are preferably controlled and monitored collectively. A typical server monitor system and method utilizes a computer connected to the blade servers in parallel. The computer can control and monitor the blade servers one by one. Each of the blade servers is monitored by the computer in a predetermined time period. However, the blade servers of the server system cannot all be monitored all the time.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
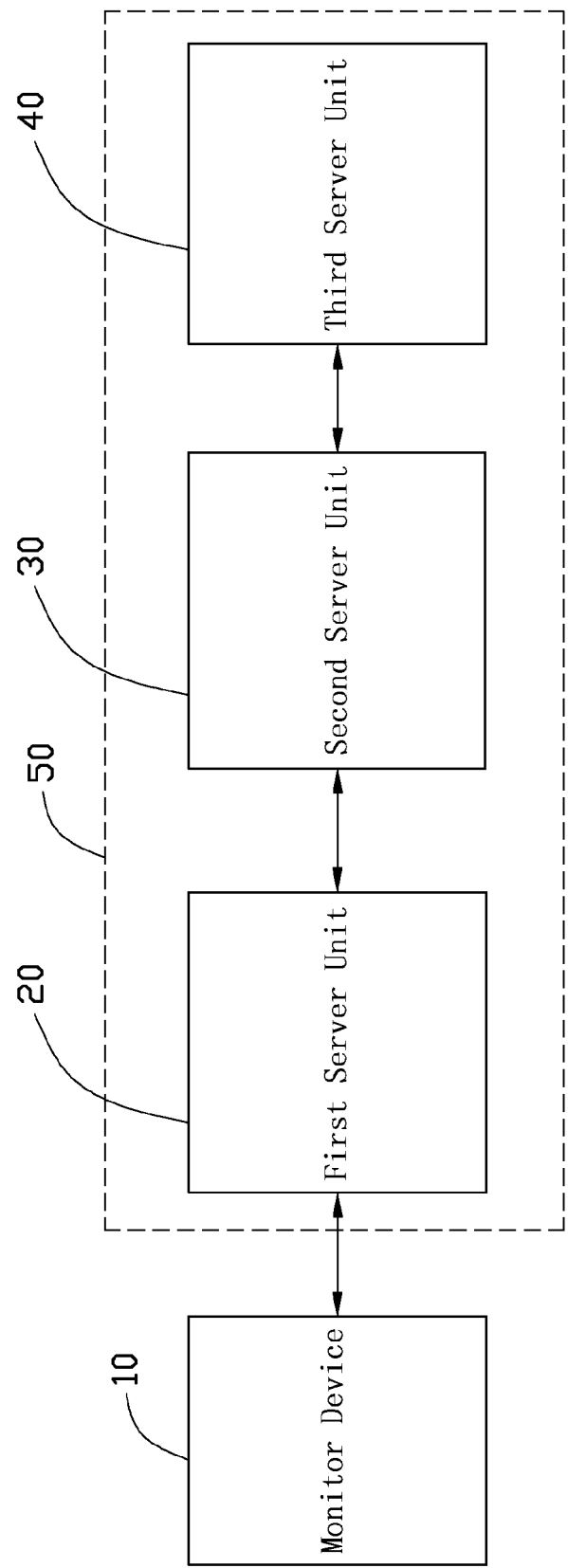
FIG. 1 is a block diagram of a server management system in accordance with an embodiment.

Referring to FIG. 1, an embodiment of a server management system includes a monitor device 10 and a blade server system 50. The blade server system 50 includes a plurality of blade servers (two or more blade servers). In one embodiment, a first blade server 20, a second blade server 30, and a third blade server 40 are used as shown in FIG. 1. The monitor device 10, the first blade server 20, the second blade server 30, and the third blade server 40 are connected in series. Each of the first blade server 20, the second blade server 30, and the third blade server 40 includes hardware and software systems that can perform various functions. The monitor device 10 can send commands to and/or receive information from the first blade server 20, the second blade server 30, and the third blade server 40 in an ordinal sequence.

Figure 2:
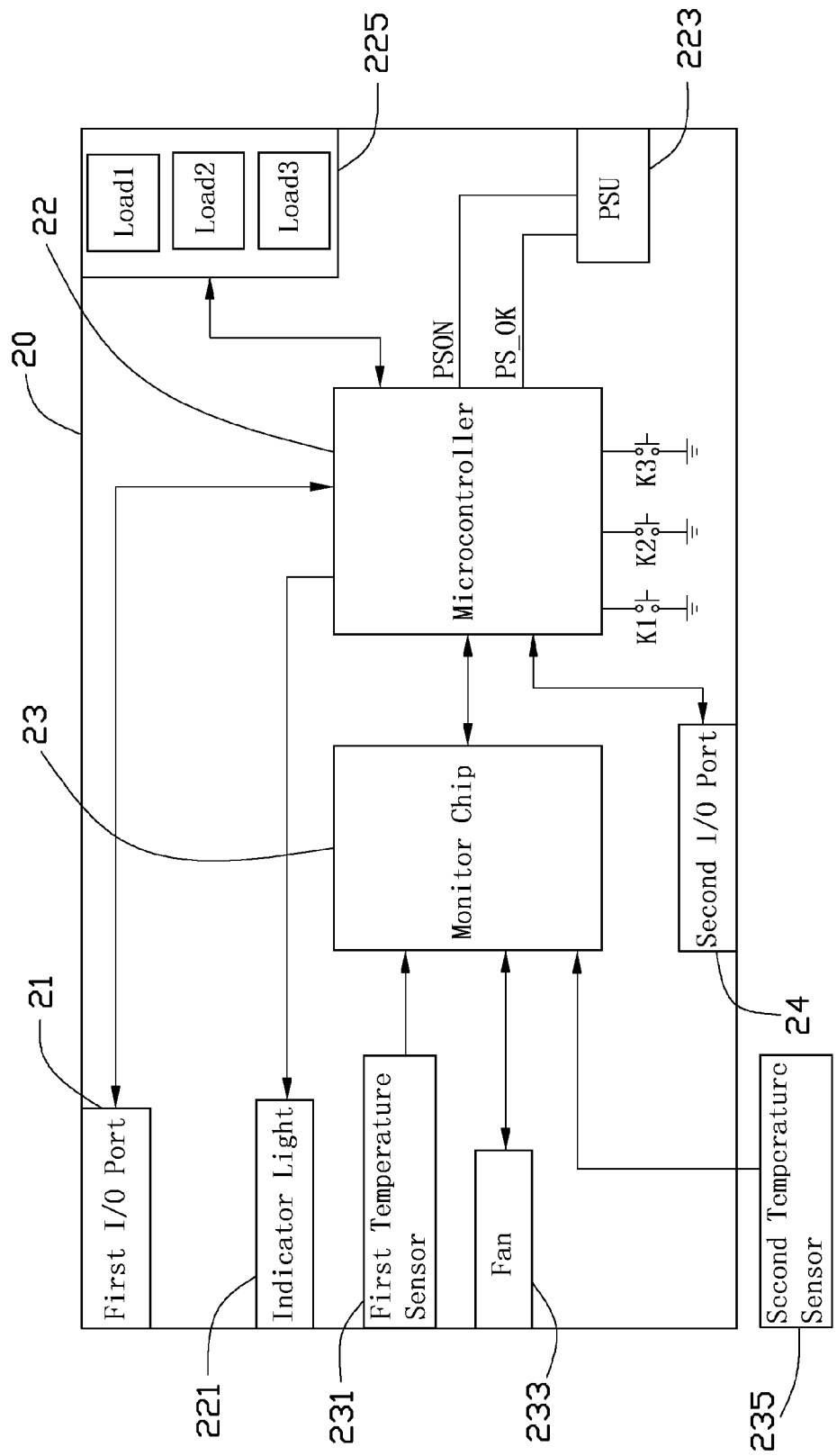
FIG. 2 is a detailed block diagram of a blade server of the server management system of FIG. 1.

Referring to FIG. 2, the first blade server 20 includes a first I/O port 21, a microcontroller 22, a monitor chip 23, and a second I/O port 24. The first I/O port 21 is configured to communicate with the monitor device 10. The second I/O port 24 is configured to communicate with a subsequent blade server. In an exemplary embodiment, the second I/O port 24 of the first blade server 20 communicates with the second blade server 30.

The first blade server 20 further includes an indicator light 221, a power supply unit (PSU) 223, and a heat generating module 225, connected to the microcontroller 22. The indicator light 221 is connected to the microcontroller 22 and configured to indicate an identification code of the first blade server 20. The PSU 223 includes a power OK (PS_OK) pin and a power supply on (PSON) pin connected to the microcontroller 22. When a voltage at the PSON pin is set from high to low level, the PSU 223 is powered on, and then the voltage at the PS_OK pin rises to a high level to indicate that output rails of the PSU 223 are all powered on. The microcontroller 22 can set the voltage at the PSON pin to low or high level and detect whether the PSU 223 can be normally powered on or off. The heat generating module 225 includes a plurality of electric loads (e.g., resistors) to simulate heat generating components which may be installed in the first blade server 20. The microcontroller 22 is connected to the heat generating module 225 to determine power consumed by the heat generating module 225. The microcontroller 22 can further enable or disable one or more of the electric loads of the heat generating module 225 to increase or decrease heat generated by the heat generating module 225. A first key K1, a second key K2, and a third key K3 are connected to the microcontroller 22. The first key K1 is configured to increase the identification code of the first blade server 20. The second key K2 is configured to decrease the identification code of the first blade server 20. The third key K3 is configured to affirm the setting of the identification code. For instance, if the first blade server 20 is assigned with an identification code 1 initially and the first key K1 is pressed once, the identification code of the first blade server 20 changes from 1 to 2. If the second key K2 is pressed once, the identification code of the first blade server 20 changes from 1 to 0. The monitor device 10 can access the blade servers according to their identification codes.

The first blade server 20 further includes a first temperature sensor 231, a fan 233, and a second temperature sensor 235, connected to the monitor chip 23. The first temperature sensor 231 is mounted in the first blade server 20 and configured to detect a temperature in the first blade server 20. The second temperature sensor 235 is mounted at an outside of the first blade server 20 to measure an environmental temperature outside the first blade server 20. The monitor chip 23 receives the temperature information detected by the first temperature sensor 231 and the second temperature sensor 235 and adjusts speed of the fan 233 accordingly.

In one embodiment, the microcontroller 22, the monitor chip 23, the first key K1, the second key K2, the third key K3, and the indicator light 221 are mounted in an integrated circuit board. This integrated circuit board can be utilized and mounted in each of the blade servers to monitor the corresponding blade servers and send the monitored information to the monitor device 10.

A configuration of each of the second blade server 30 and the third blade server 40 is similar to that of the first blade server 20 as disclosed. The second blade server 30 communicates with the monitor device 10 via the first blade server 20. The third blade server 40 communicates with the monitor device 10 via the second blade server 30 and the first blade server 20. The information monitored by the monitor chip and the microcontroller of each of the blade servers can be sent to the monitor device 10, which displays the information and controls the blade servers accordingly.

Figure 3:
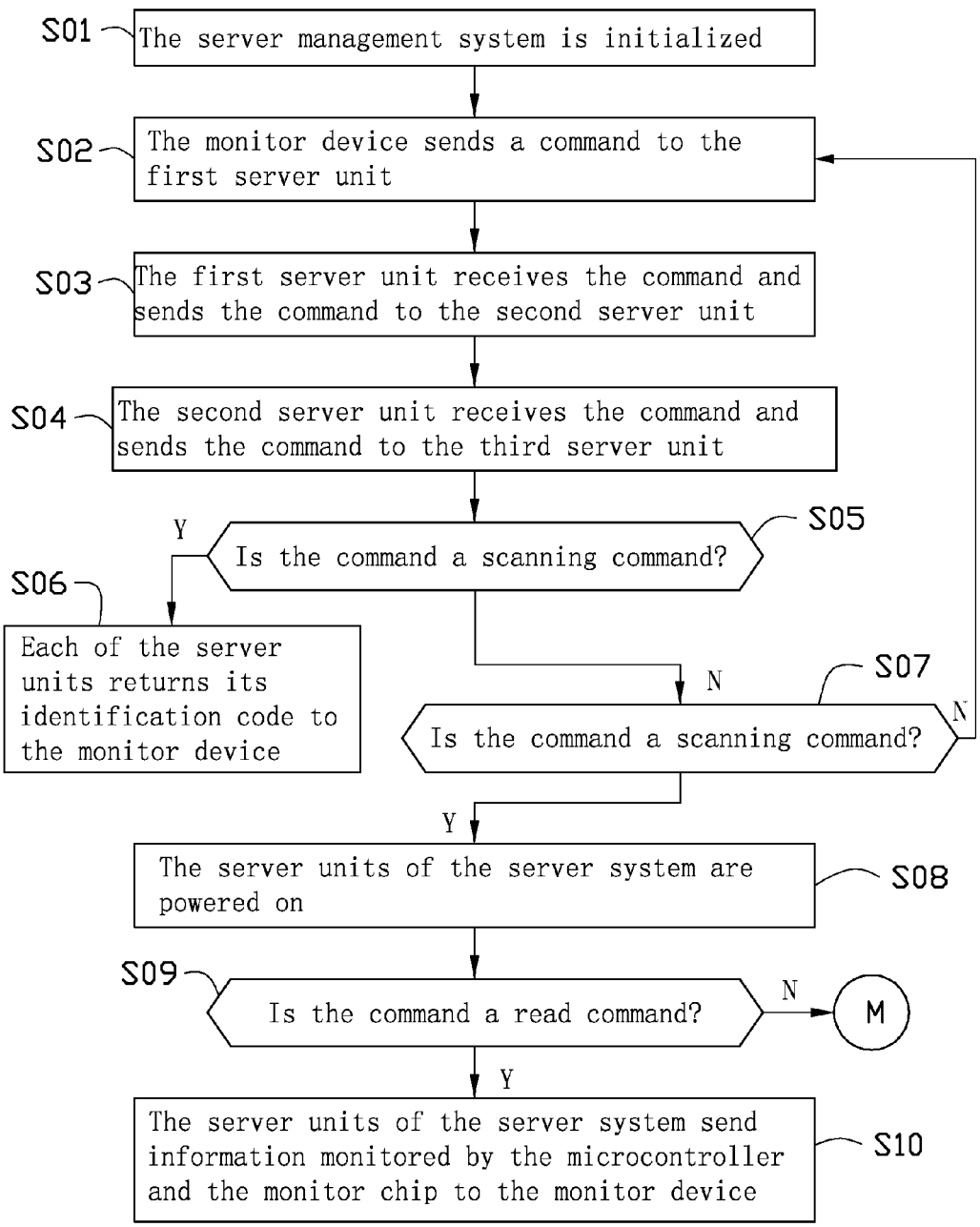
FIGS. 3-4 illustrate a flowchart of a server management method in accordance with an embodiment.
Figure 4:
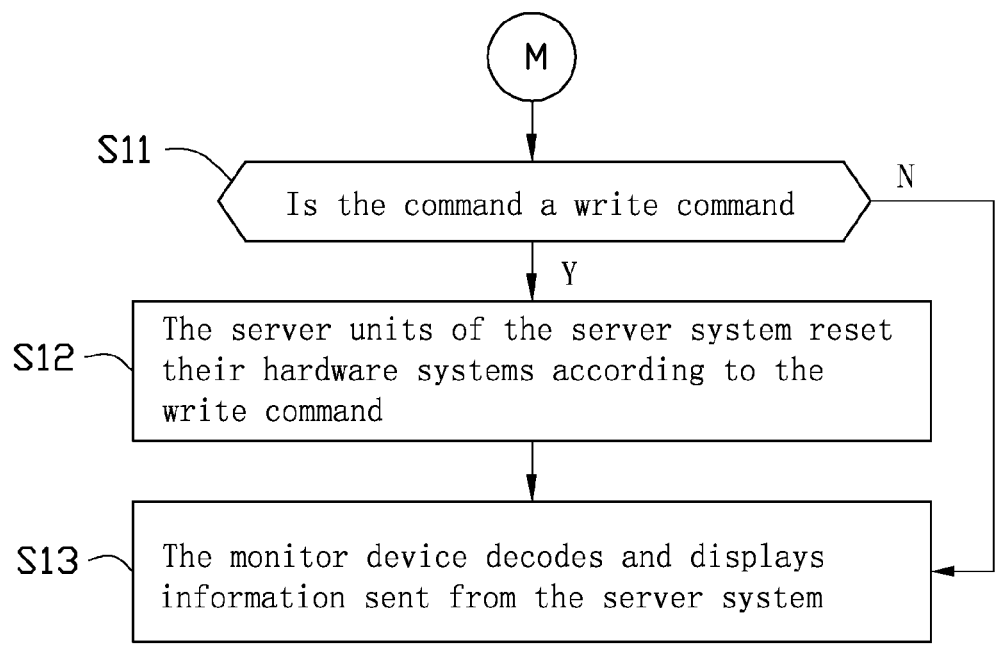

Referring to FIGS. 3 and 4, one embodiment of a server management method for a server management system includes following blocks.

In block S01, the management system is initialized.

In block S02, the monitor device 10 sends a command to the first blade server 20.

In block S03, the first blade server 20 receives the command and sends the command to the second blade server 30.

In block S04, the second blade server 30 receives the command and sends the command to the third blade server 40.

In block S05, it is determined whether the command is a scanning command. If yes, go to block S06; if not, go to block S07.

In block S06, each of the blade servers returns its identification code to the monitor device 10.

In block S07, it is determined whether the command is a power on command. If yes, go to block S08; if not, go back to block S02.

In block S08, the first blade server 20, the second blade server 30, and the third blade server 40 are powered on.

In block S09, it is determined whether the command is a read command If yes, go to block S10; if not, go to block S11.

In block S10, the first blade server 20, the second blade server 30, and the third blade server 40 send information monitored by the microcontroller 22 and the monitor chip 23 (including temperature, fan rotating speed, etc.) to the monitor device 10.

In block S11, it is determined whether the command is a write command If yes, go to block S12; if no, go to block S13.

In block S12, the first blade server 20, the second blade server 30, and the third blade server 40 reset their hardware systems (e.g., adjusting the fan rotating speed, powering on or off one or more electronic component, etc.) according to the write command.

In block S13, the monitor device decodes and displays information sent from the first blade server 20, the second blade server 30, and the third blade server 40.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A server management system comprising:
a plurality of blade servers connected to in series, each of the plurality of blade servers comprises a plurality of electric loads configured to simulate heat generating components and a microcontroller connected to the plurality of electric loads, the microcontroller configured to enable or disable one or more of the plurality of electric loads and monitor hardware information of each of the plurality of blade servers; and
a monitor device, connected to the plurality of blade servers in series, configured to receive the hardware information monitored by the microcontroller.

2. The server management system of claim 1, wherein each of the plurality of blade servers further comprises a power supply unit, and the power supply unit comprises a power supply on pin and a power good pin connected to the microcontroller.

3. The server management system of claim 1, wherein each of the plurality of blade servers further comprises a first temperature sensor mounted in each of the plurality of blade servers and a second temperature sensor mounted on an outside of each of the plurality of blade servers.

4. The server management system of claim 3, wherein each of the plurality of blade servers further comprises a fan and a monitor chip; the first temperature sensor, the second temperature sensor, and the fan are connected to the monitor chip, and the monitor chip is connected to the microcontroller.

5. The server management system of claim 1, wherein each of the plurality of blade servers further comprises an indicator light connected to the microcontroller to indicate an identification code of the corresponding blade servers.

6. The server management system of claim 5, wherein each of the plurality of blade servers has a first key, a second key, and a third key connected to the microcontroller, the first key is configured to increase the identification code, the second key is configured to decrease the identification code, and the third key is configured to confirm the setting of the identification code.

7. A method comprising:
providing an apparatus comprising a plurality of blade servers connected in series and a monitor device connected to the plurality of blade servers is series, each of the plurality of blade servers comprises a plurality of electric loads and a microcontroller connected to the plurality of electric loads, the microcontroller configured to enable or disable one or more of the plurality of electric loads and monitor hardware information of each of the plurality of blade servers;
connecting the plurality of blade servers to the monitor device in series;
sending a command from the monitor device to the plurality of blade servers;
responding the command; and
receiving information from the microcontroller to monitor and control each of the plurality of blade servers.

* * * * *